Dec. 31, 1963  E. B. STRANAHAN  3,116,049
GAME HOIST
Filed March 19, 1959  2 Sheets-Sheet 1
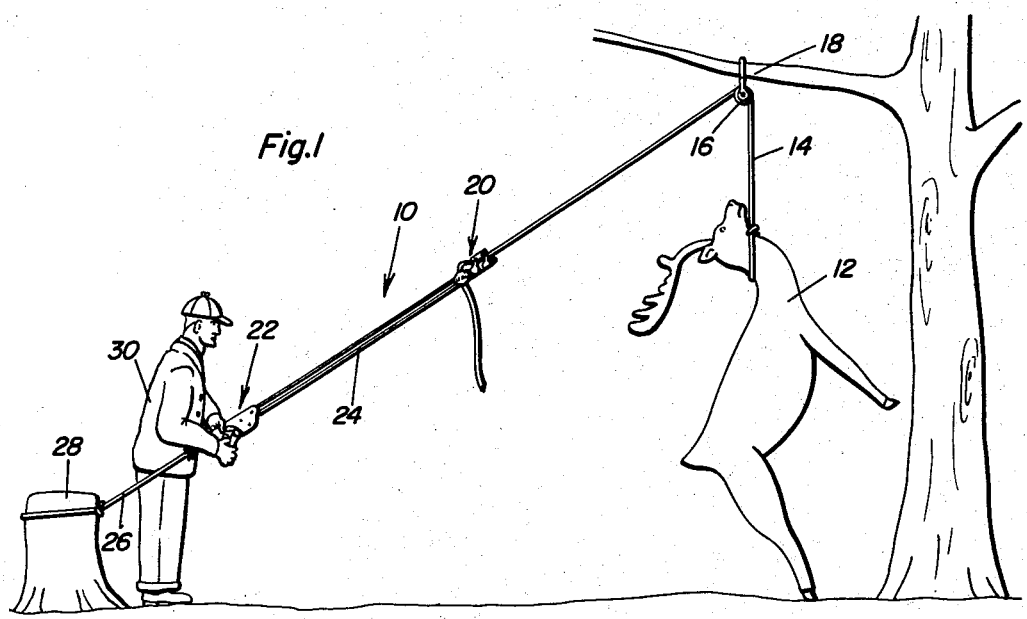
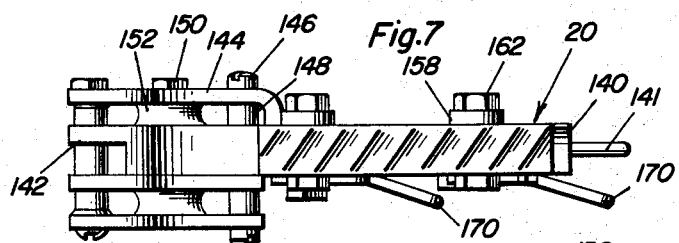
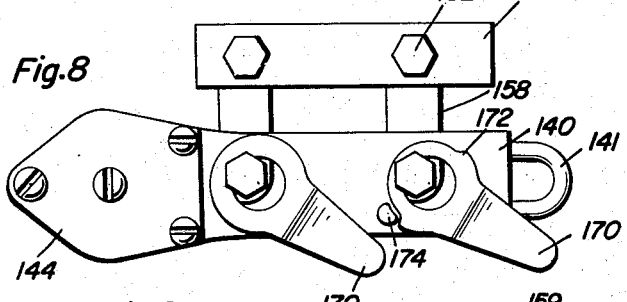
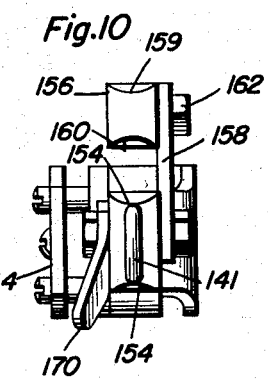
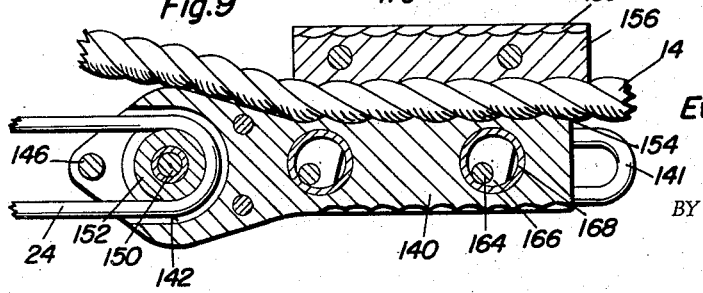
Everett B. Stranahan
INVENTOR.

Dec. 31, 1963  E. B. STRANAHAN  3,116,049
GAME HOIST
Filed March 19, 1959  2 Sheets-Sheet 2
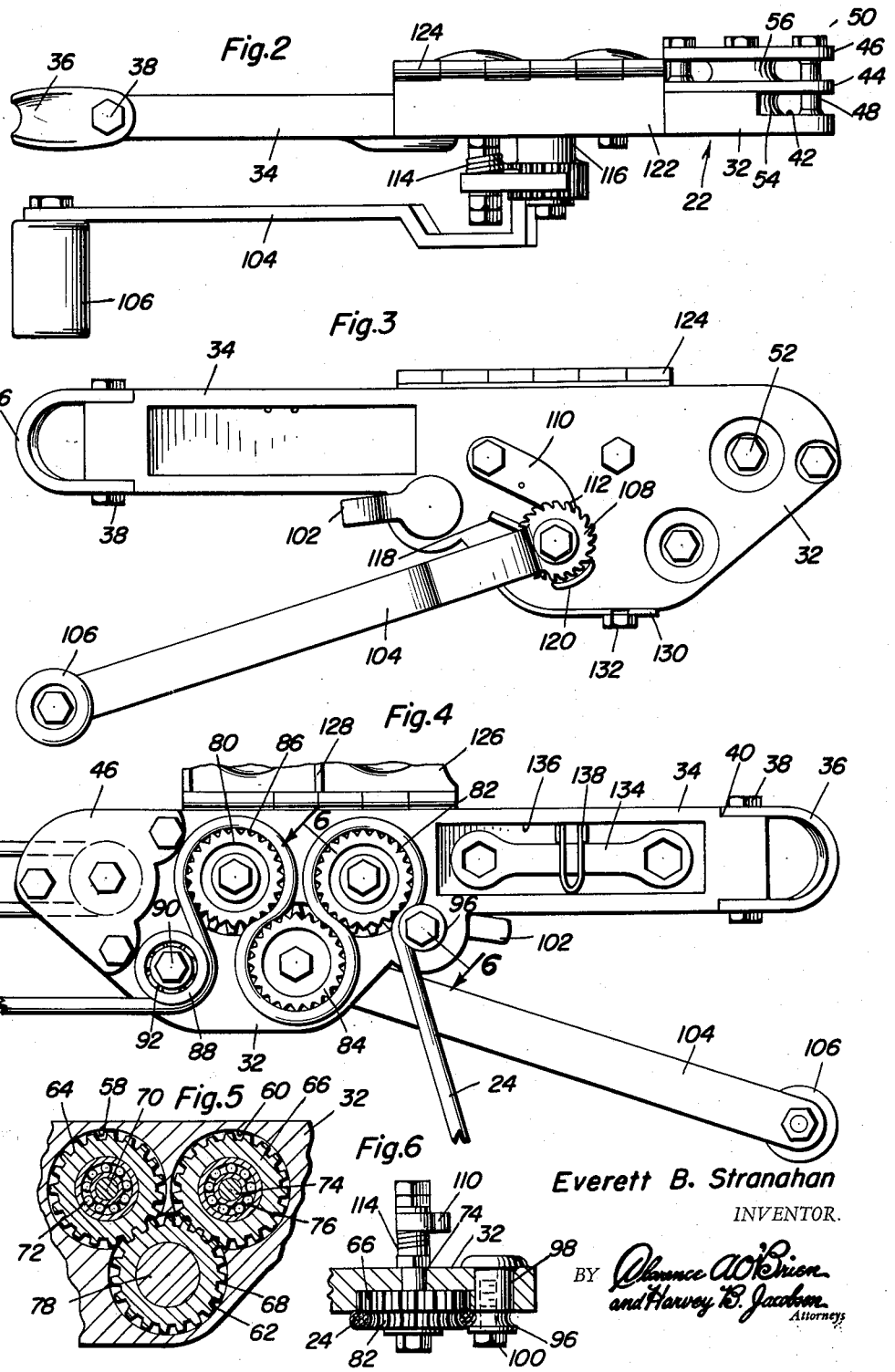
Everett B. Stranahan
INVENTOR.

ns Patent Office 3,116,049
Patented Dec. 31, 1963

3,116,049
GAME HOIST
Everett B. Stranahan, 2808 North and South Highway, Lewiston, Idaho
Filed Mar. 19, 1959, Ser. No. 800,561
3 Claims. (Cl. 254—135)

The present invention generally relates to a hoisting device and more particularly to such a device for raising game such as elk, deer or the like which has been killed by hunters although the hoist may have many other utilities.

When hunting for large game, the animal is quite frequently killed in a remote and substantially inaccessible area. Other times the animal, although mortally wounded, will continue his movements for a considerable period of time and may finally die in an inaccessible area. Inasmuch as some of the animals hunted such as elk, deer or the like are relatively large and heavy, it is extremely difficult to lift the animals and to carry the same to a more accessible area. This is especially true when the animal is disposed below a trail or disposed in gullies, washouts, creek beds or the like. When this situation is encountered, a hunter will sometimes butcher the animal while it is in the inaccessible area and then carry the butchered animal which has been severed into relatively small parts to the more accessible area. This is highly unsuccessful and is also detrimental to the quality of the meat in that the meat is not properly aged or cured as it would be if the carcass were properly handled. Accordingly, it is the primary object of the present invention to provide a hoist particularly adapted for use in hoisting game such as large animals so that the animal may be expeditiously lifted in a positive manner with the hoisting device being extremely simple in construction, safe in operation, dependable, rugged, easy to use and relatively inexpensive to manufacture and maintain.

Another object of the present invention is to provide a hoist arrangement generally in the form of a block and tackle arrangement in which novel structural features are provided for lateral removal of the line from a mechanism for moving the line linearly.

Another important feature of the present invention is to provide a hoist in accordance with the preceding objects in which the line forming part of the block and tackle assembly is connected with a power mechanism with the line being wrapped around a series of pulleys for moving the line frictionally while under load and also locking the line due to the wrap-around of the line on several pulleys arranged in a particular manner.

Yet another feature of the present invention is to provide a hoist having an operating handle with a ratchet associated therewith together with an arcuate member for sliding along the surface of the ratchet gear for rendering the ratchet mechanism ineffective.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic perspective view illustrating the hoist of the present invention in use;

FIGURE 2 is a plan view of the hoist line pulling device;

FIGURE 3 is a side elevataion of the construction of FIGURE 2;

FIGURE 4 is a side elevation of the device with the cover for the gears hinged upwardly;

FIGURE 5 is a detailed sectional view of the drive gears with the serrated pulleys removed for showing the relationship of the gears;

FIGURE 6 is a detailed sectional view taken substantially upon a plane passing along section line 6—6 of FIGURE 4 illustrating the cam lock arrangement for the flexible cord;

FIGURE 7 is a plan view of the movable block of the block and tackle assembly employed with the hoist;

FIGURE 8 is a side elevational view of FIGURE 7;

FIGURE 9 is a longitudinal, vertical sectional view illustrating the relationship of the elements of the movable blocks; and FIGURE 10 is an end view of the construction of FIGURE 7.

Referring now specifically to the drawings, the numeral 10 generally designates the game hoist of the present invention which is schematically illustrated in FIGURE 1 with the hoist 10 being employed for lifting an animal 12 having a conventional rope line 14 attached thereto and passing over a single pulley block 16 attached to a suitable support such as a tree limb 18 which are plentiful in wooded areas. The rope line 14 has a free end to which is attached the movable block or running block assembly generally designated by the numeral 20 and described in detail hereinafter. The stationary block assembly generally designated by the numeral 22 is disposed in spaced relation to the running block 20 and the block assemblies 20 and 22 coact with a small flexible line 24 to form a block and tackle arrangement. The stationary block 22 is anchored by a conventional rope line 26 to a suitable anchor such as a stump 28. The hunter 30 is illustrated in FIGURE 1 for operating the hoist 10 for easily raising the animal 12 to an elevated position with the animal 12 being shown in its final or substantially final position.

Referring now specifically to FIGURES 2-6 of the drawings in which the stationary block assembly 22 is specifically illustrated and includes a block-like body member 32 having an elongated handle forming member 34 at one end thereof. The body member 32 is machined in a manner as set forth hereinafter and the handle 34 is generally rectanglar in cross-section and includes a substantially U-shaped loop 36 at the free end thereof swivelly secured thereto by a bolt 38 with the ends of the U-shaped members 36 being received in recesses 40 in opposite edges of the handle 34. The loop 36 is employed for attaching the anchoring rope 26 to the stationary block assembly 22.

The upper edge of the body 32 is generally straight and the body 32 includes a recess 42 at the forward rounded end thereof. Mounted on the forward rounded nose or end of the body 32 is a pair of generally triangular shaped plates 44 and 46 which are retained in rigid spaced relation by a plurality of tubular spacers 48 with fastening bolts 50 extending through the spacers 48 as well as the plates 46 and 44 and the body 32 thereby rigidly securing the plates in spaced relation to each other and in spaced relation to the body 32. Centrally of the plates 44 and 46, there is provided a transverse fastener 52 which forms a supporting shaft for journaling a pair of pulleys 54 and 56 thereon which pulleys are provided with the usual concave peripheral surface and which may be supported on the fastener 52 by suitable bearings such as ball bearings or roller bearings wherein the pulleys 54 and 56 are freely rotatable.

Immediately rearwardly of the plates 44 and 46, the body 32 is provided with three circular recesses designated by the numerals 58, 60 and 62 which generally define a triangular area. Disposed in each of the recesses 58, 60 and 62 is a gear with the gears being designated by the reference numerals 64, 66 and 68. The gear 64 is supported on a shaft 70, which is in the form of a fastening bolt, by ball bearing assembly 72 and the gear 66 is supported on shaft 74 by ball bearing assembly 76. The shafts 70 and 74 respectively are secured to the body 32 by virtue of extending through the body and terminating in threaded ends having removably nuts thereon if desired for permitting removal and replacement of the gears or bearing assemblies. The gear 68 is mounted on a regular shaft 78 which is rotatable in the body 32 and may be provided with a suitable bushing type bearing. The gears 64, 66 and 68 are in meshing engagement with each other and are of equal size.

Integral with each of the gears 64, 66 and 68 is a serrated pulley with the serrated pulleys being designated by the numerals 80, 82, and 84 and having serrations 86 thereon with the serrations being generally concave for receiving a portion of the flexible line 24. At the forward area of the body 32 and generally in alignment with the pulley 84 there is provided a smooth grooved pulley 88 mounted on a shaft 90 by a ball bearing assembly 92 which also receives a portion of the line 24 and guides the line onto the first pulley 80. The spacing between the pulleys 80 and 84 is such that the line 24 may be inserted therebetween and removed and the spacing between the pulley 84 and pulley 82 is the same as the spacing between the pulley 80 and pulley 84. Thus, with the line 24 passing inwardly under the pulley 88 and then up over and substantially around the pulley 80, there will be a two-thirds wrap of the line 24 on the pulley 80. The line 24 then passes around the pulley 84 and there is another two-thirds wrap on the pulley 84 and a third two-thirds wrap on the pulley 82 thus in effect making two complete wraps on the serrated pulleys.

At the rear corner of the body 32 and adjacent the exit point of the line 24, there is provided a smooth surface grooved pulley or roller 96 supported eccentrically on a shaft 98 by a fastening member 100 with the shaft 98 having a laterally extending handle 102 on the opposite surface of the body 32 whereby pivotal movement of the handle 102 will move the roller 96 towards or away from the pulley 82 thus enabling the pulley 96 to move away from the pulley 82 for facilitating the insertion of the line 24 between the pulleys after which the roller 96 may be moved inwardly towards pulley 82 for retaining the line 24 in position and preventing the same from dropping laterally off of the pulleys 82.

The shaft 78 is rotatably journaled in the body 32 and has an elongated handle 104 attached to the outer end thereof. The handle 104 is provided with a laterally extending hand grip 106 for facilitating rotation of shaft 78. Rigid with the inner end of the handle where it is attached to the shaft 78 is a ratchet gear 108. The shaft 74 also extends beyond the other surface of the body 32 and has supported thereon a pawl or dog 110 having teeth 112 which will engage the teeth of the ratchet gear 108 for preventing counterclockwise or reverse rotation of the handle 104. The teeth on the ratchet gear 108 as well as the pawl 112 are inclined so that they will prevent rotation in one direction and permit rotation in another direction. An axial coil spring 114 is mounted on the shaft 74 and may have one end attached to the dog 110 and the other end attached to a stationary part of the plate or shaft whereby the pawl or dog 110 is resiliently urged into engagement with the ratchet gear 108. Rotatably mounted on the portion of the shaft 78 between the body 32 and the ratchet gear 108 is a cylindrical sleeve 116 provided with a projecting handle 118 rigidly connected thereto. Supported from the sleeve 116 is an arcuate plate 120 which lies alongside of the outer ends of the teeth of the ratchet gear 108. Thus, by rotating the sleeve 116 by moving the handle 118, the plate 120 may be moved between the ratchet gear 108 and the pawl 110 thus rendering the pawl 110 ineffective so that the handle 104 may be rotated in either direction which will permit the flexible line 24 to be wound through the assembly 22 in either direction.

Along the top edge of the body 32 and immediately rearwardly of the plates 44 and 46, there is provided a supporting plate 122 having a piano type hinge 124 along the longitudinal edge thereof overlying the recess surface of the body 32 with the piano hinge 124 supporting a cover 126 for the gears and pulleys including the pulleys 88, 80, 82, 84 and 96. The cover 126 is provided with inwardly extending dividers 128 which extend between the portions of the line 24 disposed closely adjacent to each other. The dividers will extend between the pulleys 88 and 84, the pulleys 80 and 82 and the pulleys 96 and 84. The cover 126 is also provided with an inwardly extending outer flange 130 on its outer edge which overlies the bottom edge of the plate 32 and is retained in position by a fastening bolt 132. All of the variously mentioned shafts may be of any conventional construction but have been shown as fastening bolts for the purpose of convenience and for the purpose of easy removal thereof. For working on the device, there is provided a wrench 134 of the closed end variety disposed in a recess 136 in the handle 34 with there being a spring clip 138 for detachably holding the wrench 134 in position.

In using the device, the line 24 is threaded through the double pulley block in the usual manner with the free end of the line 24 then being placed laterally around the pulleys 88, 80, 84 and 82 in the manner illustrated with the pulley 96 then being moved to a clamped position. It makes no difference if there is slack in the line 24 between the various pulleys since the rotation of the gears will cause the slack to be removed inasmuch as there will be a certain degree of slippage between the line 24 and the pulleys until such time as all of this slack is removed from the line 24. This feature eliminates the necessity of threading the line 24 inwardly in a direction parallel to the surface of the pulleys and eliminates the necessity of pulling the free end of the line back through the pulleys since the cover 126 may be easily opened and the line 24 removed after the roller 96 has been retracted. This lateral disengagement of the line 24 from the pulleys enables the block assemblies 20 and 22 to be rapidly and easily moved apart so that the moving block 20 may take another purchase on the line 14. Thus, the two complete wraps effected by the orientation of the pulleys 80, 82 and 84 provide adequate pulling force for purposes of this nature and the flexible line 24 will not be damaged since there are a plurality of points of engagement and application of force thereby assuring long life for the flexible line 24.

Referring now specifically to FIGURES 7–10, the running block or moving block 20 includes a generally elongated body member 140 having an enlarged generally rounded forward end having a recessed area 142. A plurality of plates 144 are secured to the forward end of the body 140 and are held thereon by fastening bolts 146 with spacers 148 retaining the plates 144 in spaced relation. Centrally of the plates 144, there is provided a transverse shaft in the form of a fastening member 150 rotatably supporting three smooth surfaced grooved pulleys 152 which receive the flexible line 24 thus forming the other part of the block and tackle assembly. Each edge of the body 140 is grooved as indicated by the numeral 154 for receiving the rope line 14. A clamp bar 156 is supported from the body 140 by a pair of parallel pivoted links 158. The clamp bar 156 is provided with a grooved upper surface 159 as well as a grooved lower surface 160 for registry with the grooved lower edge 154 inasmuch as the parallel links 158 may be reversed and extend downwardly thus enabling the grooves 154 and 159 to form a clamp for the flexible line 14.

The parallel links 158 are attached to the clamp bar by fastening members 162 with the lower ends thereof being supported by shaft members 164 which are located in a sleeve 166 rigid with but eccentric in relation to a tubular sleeve 168 rotatably journaled in an aperture in the body 140. The sleeve 166 is provided with an offset handle 170 which is also rigid with the sleeve 168. Thus, rotation of the handle 170 will cause inward and outward movement of the clamp bar 156 in relation to the body 140. This action clamps the rope 14 in position and as pressure is applied on the rope 14, the clamping action will be increased due to the parallel links 158 and the pulling exertion exerted by the flexible line 14. By using the groove 154 in the bottom of the body 140 and by placing the clamp bar 156 below the body, different size flexible ropes or the like may be rigidly clamped. The handle 170 is provided with projecting lugs 172 for engagement with a stop pin 174 for limiting the movement thereof. The other handle 170 will abuttingly engage the rear edge of one of the plates 144 for limiting the rotational or pivotal movement thereof. Thus, the running block assembly 20 permits the block to be engaged with the line 14 at any point along its length by lateral insertion of the rope and by a cam grip clamping means together with the action of the tension exerted by the block. The body 140 may be provided with a lateral opening for receiving an elongated member which may engage the ground so that the flexible rope 14 will not cause the block and tackle assembly to twist thereby twisting the line 24.

Also, a loop 141 is provided on the body 140 in the event a larger or smaller rope is used thereby enabling the rope to be secured to the body by a conventional knot. While the gears 64, 66 and 58 are shown as being equal in size, it is pointed out that the size may vary in order to compensate for stretch of the line.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a hoist device, a stationary block comprising a body having a pulley thereon for receiving a flexible line and forming a guide therefor, and three rotatable and driven gripping pulleys mounted in the same plane on said body with the axes of said gripping pulleys defining a triangle and with two-thirds of a warp of a flexible line engaging each of the gripping pulleys without the line crossing itself, a hinged cover pivotally connected with the body and overlying and providing a cover for the pulleys for preventing entanglement of the flexible line but permitting the line to be laterally assembled onto and removed from the pulleys, said cover including a divider engageable between the wraps of the line on at least two of the driven pulleys.

2. In a hoist, a stationary block assembly comprising an entrance guide pulley, an exit guide pulley, three driven pulleys mounted between the entrance guide pulley and the exit guide pulley, means drivingly interconnecting the three driven pulleys, each of the guide pulleys having a peripheral groove, a flexible line extending over all the pulleys, and handle means connected to one of the driven pulleys for simultaneously rotating all the pulleys, all of said driven pulleys being rotatable about parallel axes defining the apexes of a triangle, the entrance guide pulley and exit guide pulley each being located adjacent a first and second of the three pulleys, all of said pulleys being disposed in the same plane whereby the line makes a single serpentine pass through the block and does not cross under itself, said line entering over the entrance guide pulley and then extending around a major portion of the periphery of the adjacent first pulley of the three pulleys, then engages around a major portion of the periphery of a third pulley of the three pulleys, then around a major portion of the periphery of the second of the three pulleys, and then around a portion of the exit guide pulley thereby causing linear movement of the line upon rotation of the drivingly interconnected pulleys, said pulleys being spaced apart a distance generally equal to the diameter of the flexible line, said block including a pivotal cover section for normally overlying one surface of the pulleys and being movable to a position to provide access to the lateral surface of the pulleys thereby enabling lateral assembly and disassembly of the line onto the pulleys for enabling connection of the block with the flexible line at any desired point thereon, said cover section comprising a divider engageable between the wraps of the line around certain of the driven pulleys.

3. A hoist device comprising a body, a plurality of meshed gears rotatably mounted on said body, means for actuating the gears, pulleys on one side of the gears for receiving a flexible line to be driven, a shaft rotatably mounted in the body adjacent one of the pulleys, a guide roller for the line journaled off-center, on one end of the shaft in opposed relation to said one pulley, and an operating handle on the other end of the shaft for shifting the guide roller toward or away from said one pulley, a cover for the pulleys hingedly mounted on the body, said cover including a divider engageable between the wraps of the line on the pulleys.

References Cited in the file of this patent

UNITED STATES PATENTS

| | | |
|---|---|---|
| 207,799 | Davis | Sept. 10, 1878 |
| 259,190 | Meatyard | June 6, 1882 |
| 344,306 | Chambers | June 22, 1886 |
| 860,809 | Keller | July 23, 1907 |
| 1,203,385 | Murn | Oct. 31, 1916 |
| 1,234,475 | Hilding | July 24, 1917 |
| 1,296,870 | Sohm | Mar. 11, 1919 |
| 1,328,678 | Lemieux | Jan. 20, 1920 |
| 1,331,414 | Clarke | Feb. 17, 1920 |
| 1,784,521 | Gwinn et al. | Dec. 9, 1930 |
| 1,917,691 | Belt | July 11, 1933 |
| 2,235,302 | Stillwagon | Mar. 18, 1941 |
| 2,508,187 | Niemiec | May 16, 1950 |
| 2,570,320 | Christensen | Oct. 9, 1951 |
| 2,644,339 | Kamplade | July 7, 1953 |
| 2,828,647 | Reinsch | Apr. 1, 1958 |
| 2,853,273 | Berge | Sept. 23, 1958 |